Aug. 21, 1945.  J. A. McLEAN  2,383,000
BICYCLE
Filed Sept. 29, 1943  2 Sheets-Sheet 1
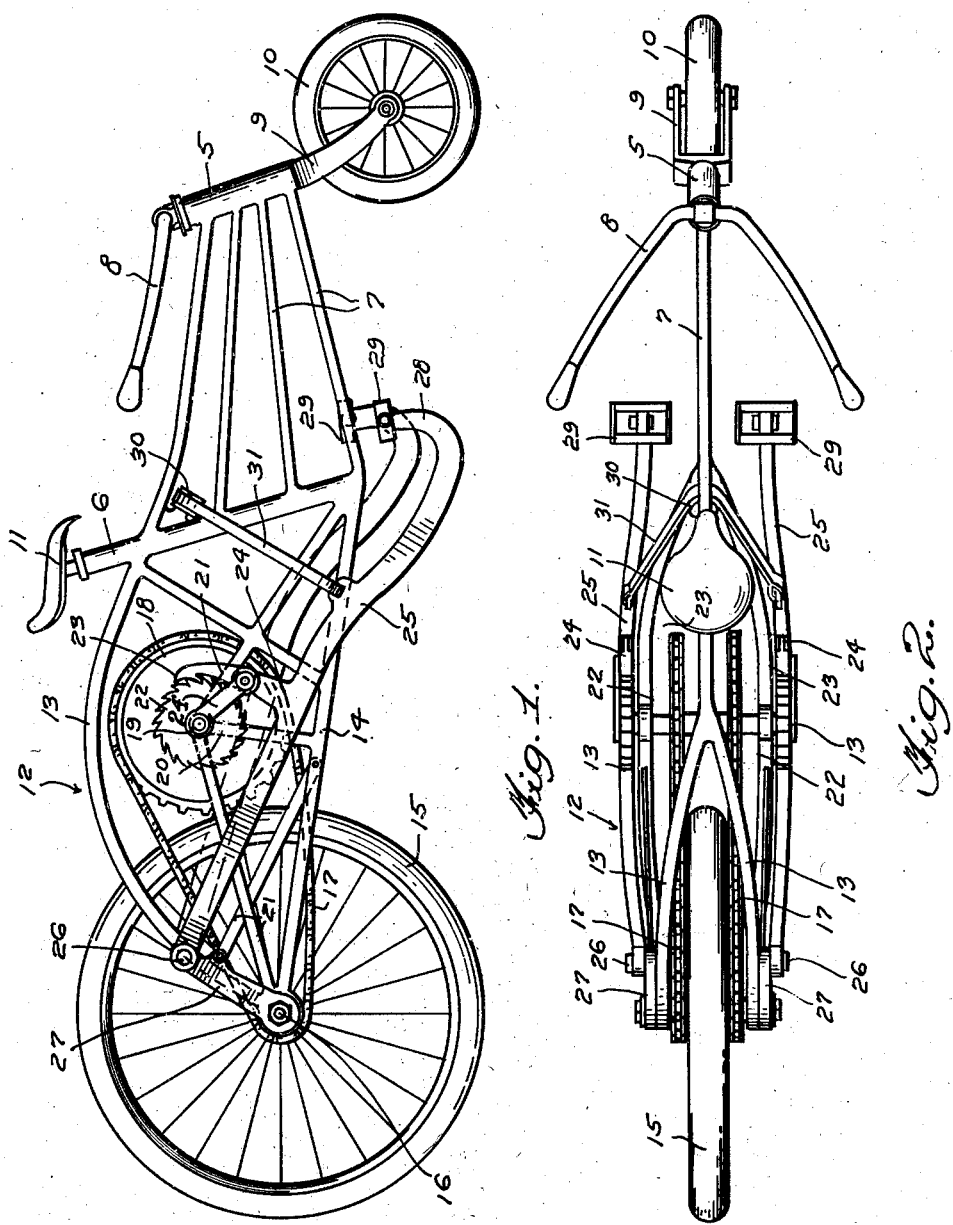
Inventor
JOHN A. McLEAN
By *Clarence A. O'Brien and Harvey B. Jacobson*
Attorneys Aug. 21, 1945.  J. A. McLEAN  2,383,000
BICYCLE
Filed Sept. 29, 1943  2 Sheets-Sheet 2

Inventor
JOHN A. McLEAN
By Clarence A. O'Brien
and Harvey B. Jacobson
Attorneys

Patented Aug. 21, 1945

2,383,000

UNITED STATES PATENT OFFICE 2,383,000

BICYCLE

John A. McLean, Edmonton, Alberta, Canada

Application September 29, 1943, Serial No. 504,316

2 Claims. (Cl. 280—258)

This invention appertains to new and useful improvements in bicycles and more particularly to a bicycle which has as its principal object the provision of means whereby the machine can be driven at a higher rate of speed than present types of bicycles without increased human effort.

Another important object of the invention is to provide a bicycle which will be more shock-absorbing than the bicycles of present design.

Still another important object of the invention is to provide a bicycle which will have a more equalized balance than bicycles of conventional construction.

These and various other important objects and advantages of the invention will become apparent to the reader of the following description.

In the drawings—

Figure 1 represents a side elevational view.

Figure 2 is a top plan view.

Figure 3:
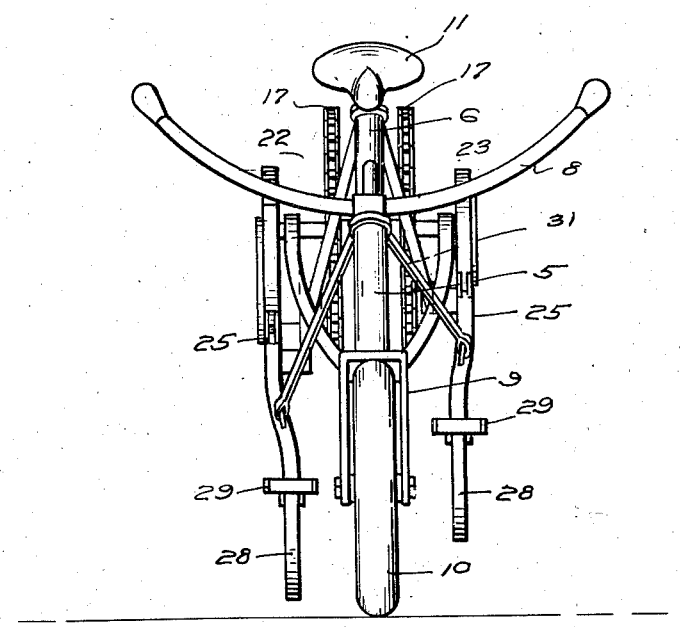
Figure 3 is a front elevation.
Figure 4:
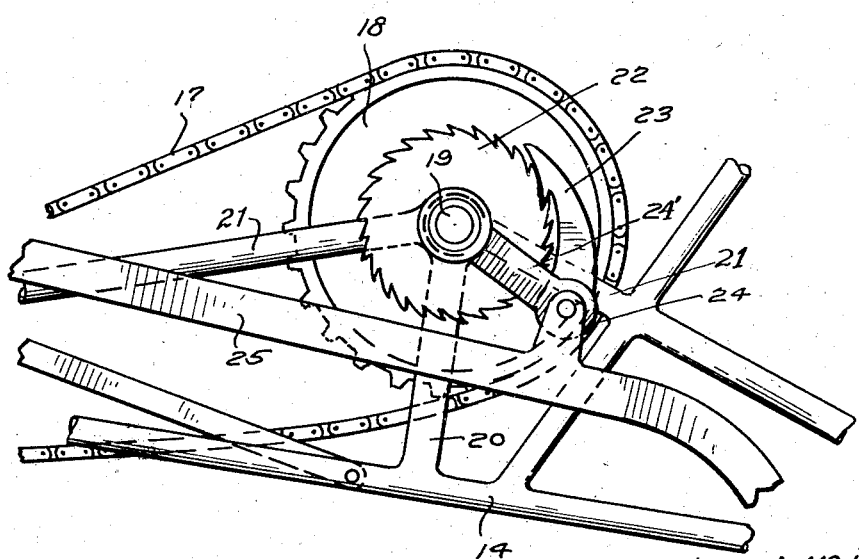
Figure 4 is an enlarged fragmentary side elevational view showing the pawl and ratchet mechanism.

Referring to the drawings wherein like numerals designate like parts, it can be seen that numerals 5 and 6 denote the steering and seat post respectively connected by bars 7. Numeral 8 denotes a hand bar suitably secured to a shaft journaled through the post 5 and having a fork 9 at its lower end in which a small wheel 10 is mounted. A seat 11 is provided at the upper end of the post 6.

A bifurcated frame structure 12 is provided rearwardly from the post 6, this frame including upper and lower bars 13 and 14 which extend to each side of a rear wheel 15. The rear wheel 15 is mounted between the rear ends of the bifurcated frame 12 and is on a shaft 16 with a pair of sprocket wheels from which extend sprocket chains 17 that pass over a pair of large sprocket wheels 18 secured to a shaft 19, the ends of which are journaled through the upper ends of risers 20 rising from the lower frame members 14. Brace members 21 are provided for the risers 20.

On each end portion of the shaft 19 is a ratchet wheel 22 with which a hook-shaped pawl 23 is engageable. Each of these pawls 23 is swingably mounted on a lug 24 located on the intermediate portion of a swingable beam 25. Links 24' are pivoted on the ends of shaft 19 and are pivoted to the respective lugs 24. Each of these beams is pivotally secured as at 26 from its rear end to the upper end of an upstanding arm 27 at the rear end of the frame 12. These beams 25 extend forwardly, dipping downwardly and at their forward ends being curved upwardly as at 28 and provided with foot treadles 29. The beams 25 may be permitted slight forward and rearward movement by loose connections at 16 and/or 26, thereby avoiding binding of said beams.

A pulley or roller 30 is mounted on the upper portion of the post 6 and has a metallic tape 31 trained thereover, the ends of this tape being secured to the forward portions of the beams 25. Obviously, this tape 31 serves to support the beams and as one beam is depressed, the tape 31 will serve to raise the other, in order to move the pawl 23 backwardly on its corresponding ratchet wheel 22.

This ratchet action affords a much more direct drive, eliminating a considerable amount of the lost motion found in conventional sprocket chain drives.

Furthermore, by having the drive in the present invention in each side of the rear wheel, a better balanced machine is available.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a bicycle, steering and seat posts, bars rigidly connecting said posts, a horizontally elongated and bifurcated rigid frame structure rigid with and extending rearwardly from said seat post, a rear supporting wheel mounted on an axle between the rear ends of the furcations of the bifurcated frame structure, a pair of sprocket wheels mounted on a shaft journaled in the bifurcated frame structure behind the upper portion of the seat post and in front of and above the axle of the rear supporting wheel, driving connections between said sprocket wheels and said rear supporting wheel, arms at the rear of the frame structure, extending upwardly from the rear wheel axle, beams pivoted at their rear ends to the upper ends of said arms, and extending forwardly and downwardly to a point in front of the lower end of the seat post, said beams having upstanding lugs intermediate their ends and pedals on their forward ends, links pivoted on the shaft of the sprocket wheels and extending forwardly and downwardly and pivoted to the beam lugs, ratchet wheels on the shaft of the sprocket wheels, and upstanding pawls pivoted to the beam lugs and engaging said ratchet wheels.

2. In a bicycle, steering and seat posts, bars rigidly connecting said posts, a horizontally elongated and bifurcated rigid frame structure rigid with and extending rearwardly from said seat post, a rear supporting wheel mounted on an axle between the rear ends of the furcations of the bifurcated frame structure, a pair of sprocket wheels mounted on a shaft journaled in the bifurcated frame structure behind the upper portion of the seat post and in front of and above the axle of the rear supporting wheel, driving connections between said sprocket wheels and said rear supporting wheel, arms at the rear of the frame structure, extending upwardly from the rear wheel axle, beams pivoted at their rear ends to the upper ends of said arms, and extending forwardly and downwardly to a point in front of the lower end of the seat post, said beams having upstanding lugs intermediate their ends and pedals on their forward ends, links pivoted on the shaft of the sprocket wheels and extending forwardly and downwardly and pivoted to the beam lugs, ratchet wheels on the shaft of the sprocket wheels, and upstanding pawls pivoted to the beam lugs and engaging the ratchet wheels, a pulley mounted directly in front of the seat post below one of the post connecting bars, and a flexible member passing over said pulley and connected at its ends to the respective beams rearwardly of the pedals and the seat post.

JOHN A. McLEAN.